(12) United States Patent
Kamei et al.

(10) Patent No.: US 10,499,660 B2
(45) Date of Patent: Dec. 10, 2019

(54) REFRIGERATION DEVICE FOR CONTAINER

(71) Applicant: DAIKIN INDUSTRIES, LTD., Osaka-shi, Osaka (JP)

(72) Inventors: Noritaka Kamei, Osaka (JP); Kazuma Yokohara, Osaka (JP); Naohiro Tanaka, Osaka (JP); Atsushi Ozato, Osaka (JP)

(73) Assignee: DAIKIN INDUSTRIES, LTD., Osaka-shi, Osaka (JP)

( * ) Notice: Subject to any disclaimer, the term of this patent is extended or adjusted under 35 U.S.C. 154(b) by 349 days.

(21) Appl. No.: 15/508,672

(22) PCT Filed: Aug. 28, 2015

(86) PCT No.: PCT/JP2015/004359
§ 371 (c)(1),
(2) Date: Mar. 3, 2017

(87) PCT Pub. No.: WO2016/042715
PCT Pub. Date: Mar. 24, 2016

(65) Prior Publication Data
US 2017/0251682 A1    Sep. 7, 2017

(30) Foreign Application Priority Data
Sep. 16, 2014   (JP) ................. 2014-188020

(51) Int. Cl.
*A23B 7/04*   (2006.01)
*A23B 7/148*  (2006.01)
(Continued)

(52) U.S. Cl.
CPC ............ *A23B 7/0425* (2013.01); *A23B 7/148* (2013.01); *F25D 11/003* (2013.01);
(Continued)

(58) Field of Classification Search
CPC .................................................. A23B 7/0425
(Continued)

(56) References Cited

U.S. PATENT DOCUMENTS 5,515,693 A   5/1996   Cahill-O'Brien et al.
5,872,721 A   2/1999   Huston et al.
(Continued)

FOREIGN PATENT DOCUMENTS

CN   100365358 C   1/2008
EP   3045844 A1   7/2016
(Continued)

OTHER PUBLICATIONS

International Search Report issued in PCT/JP2015/004359, PCT/ISA/210, dated Nov. 10, 2015.

*Primary Examiner* — Lori L Baker
(74) *Attorney, Agent, or Firm* — Birch, Stewart, Kolasch & Birch, LLP

(57) ABSTRACT

A container refrigeration apparatus includes a CA system which controls the composition of the air in the container. The CA system includes a gas supply device which supplies nitrogen-enriched air, an intake duct which guides outside air to a first space on a suction side of an interior fan, and an exhaust duct which guides air in a second space on the blowout side of the interior fan out of a container. The exhaust duct has an inlet at a location where the flow of the air blown from the interior fan is blocked by a fan housing.

18 Claims, 8 Drawing Sheets

(51) Int. Cl.
  *F25D 11/00*   (2006.01)
  *F25D 17/04*   (2006.01)
  *F25D 17/06*   (2006.01)
  *B63B 25/06*   (2006.01)
  *B63B 25/26*   (2006.01)
  *B63J 2/08*    (2006.01)

(52) U.S. Cl.
  CPC ........... *F25D 17/042* (2013.01); *F25D 17/06* (2013.01); *A23V 2002/00* (2013.01); *B63B 25/06* (2013.01); *B63B 25/26* (2013.01); *B63J 2/08* (2013.01)

(58) Field of Classification Search
  USPC ............................................................ 99/468
  See application file for complete search history.

(56) References Cited

U.S. PATENT DOCUMENTS

| | | |
|---|---|---|
| 6,763,677 B1 | 7/2004 | Burchill et al. |
| 2016/0245555 A1 | 8/2016 | Tanaka et al. |

FOREIGN PATENT DOCUMENTS

| | | |
|---|---|---|
| JP | 52-80563 A | 7/1977 |
| JP | 63-24823 A | 2/1988 |
| JP | 2635535 B2 | 7/1997 |
| JP | 2003-254659 A | 9/2003 |
| JP | 2006-52913 A | 2/2006 |
| JP | 2007-509309 A | 4/2007 |
| JP | 2013-11420 A | 1/2013 |
| JP | 2014-25624 A | 2/2014 |
| WO | WO 2015/049840 A1 | 4/2015 |

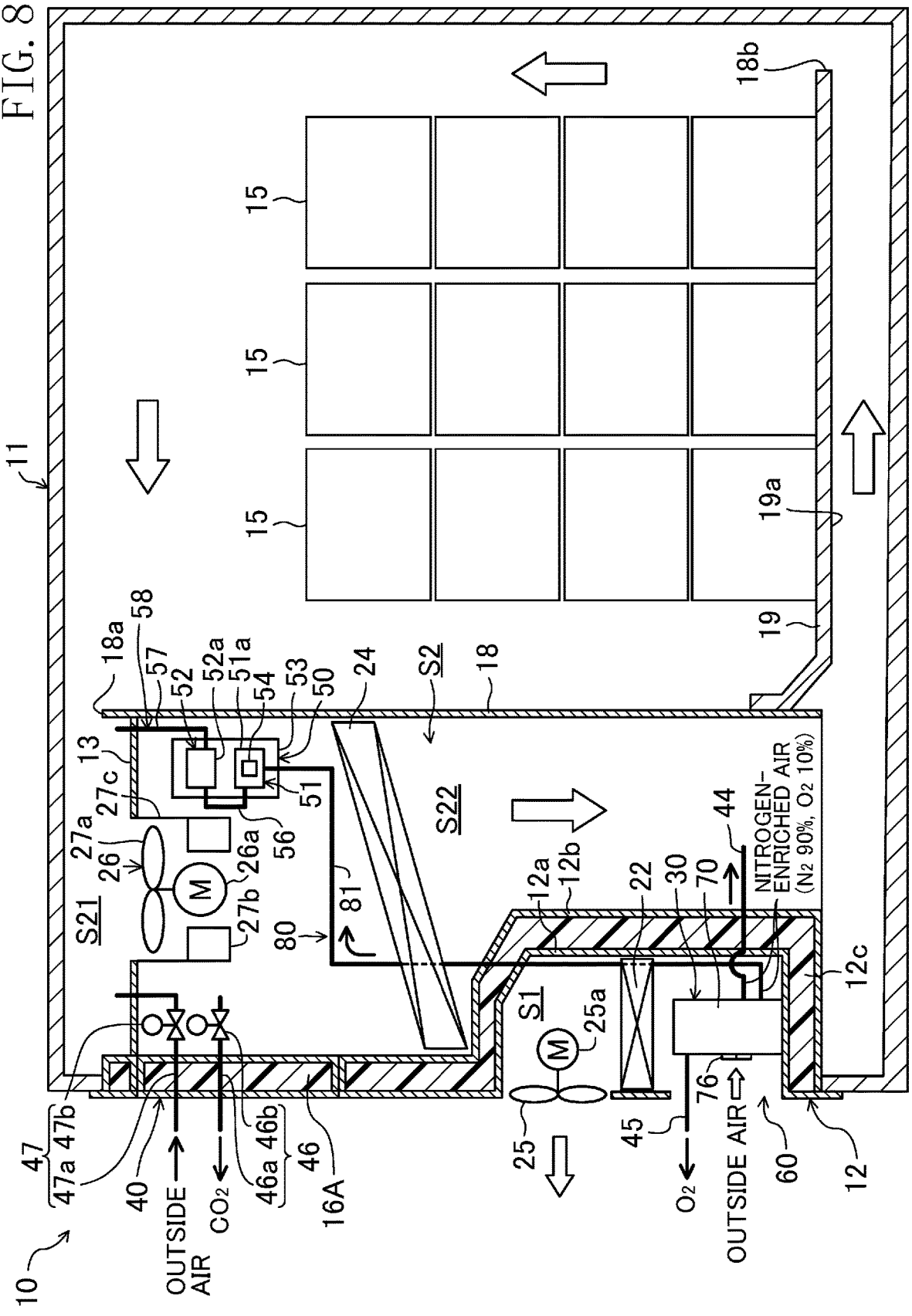

REFRIGERATION DEVICE FOR CONTAINER

TECHNICAL FIELD

The present invention relates to a container refrigeration apparatus which cools the air in a container and controls the composition of the air in the container.

BACKGROUND ART

Container refrigeration apparatuses including a refrigerant circuit performing a refrigerant cycle have been used to cool air in a container for use in, e.g., marine transportation (see, e.g., Patent Document 1). The container is loaded with plants such as bananas and avocados. Plants perform respiration by absorbing oxygen in the air and releasing carbon dioxide even after they have been harvested. The plants lose their nourishment and moisture as they respire. Thus, if the respiration rate of the plants increases, the degree of freshness of the plants decreases significantly.

Patent Document 1 discloses a container refrigeration apparatus including a gas supply device which supplies nitrogen-enriched air produced by separating nitrogen from air into a container. This container refrigeration apparatus supplies the nitrogen-enriched air into the container so that the air in the container has a lower oxygen concentration than the outside air, thereby reducing the respiration rate of the plants, and keeping the plants fresh easily.

To keep the plants fresh, a carbon dioxide concentration of the air in the container needs to be controlled appropriately in addition to the oxygen concentration. From this point of view, a container refrigeration apparatus which takes outside air into the container and exhausts inside air out of the container so that the composition of the air in the container (oxygen concentration and carbon dioxide concentration) is controlled to obtain a desired composition has been proposed. Another container refrigeration apparatus includes an intake passage through which a first space on the suction side of an interior fan communicates with the exterior of the container, and an exhaust passage through which a second space on the blowout side of the interior fan communicates with the exterior of the container, so that the air is taken in or exhausted by making use of a pressure difference produced between an inlet and an outlet of each passage while the interior fan is rotating.

CITATION LIST

Patent Document

[Patent Document 1] Japanese Patent No. 2635535

SUMMARY OF THE INVENTION

Technical Problem

According to the above-described container refrigeration apparatuses, however, depending on the position of the inlet of the exhaust passage, the outside air taken in through the intake passage may possibly be exhausted out of the container without having been sufficiently mixed with the air in the container. This may increase the risk that the composition of the air in the container would not be controlled sufficiently accurately to obtain a desired composition.

In view of the foregoing, the present invention is directed to a container refrigeration apparatus which takes outside air into the container and exhausts inside air out of the container to control the composition of the air in the container. An object of the present invention is to prevent the outside air taken into the container from being exhausted out of the container without having circulated through the container.

Solution to the Problem

A first aspect of the present invention is directed to a container refrigeration apparatus installed in a container (11) which houses respiring plants (15), the container refrigeration apparatus including: a refrigerant circuit (20) in which a compressor (21), a condenser (22), an expansion mechanism (23), and an evaporator (24) are connected together to perform a refrigeration cycle; a casing (12) which is provided at an open end of the container (11), and forms an internal storage space (S2) housing the evaporator (24) and communicating with the interior of the container (11); and an interior fan (26) which is provided in the internal storage space (S2), and circulates air between the interior of the container (11) and the internal storage space (S2). The container refrigeration apparatus further includes an inside air control system (60) which controls the composition of the air in the container (11), the inside air control system (60) including: a gas supply device (30) which supplies nitrogen-enriched air having a higher nitrogen concentration than outside air to the internal storage space (S2); an intake passage (47a) which allows a first space (S21) on the suction side of the interior fan (26) in the internal storage space (S2) to communicate with the exterior of the container (11) so that the outside air is guided into the first space (S21); and an exhaust passage (46a) which allows a second space (S22) on the blowout side of the interior fan (26) in the internal storage space (S2) to communicate with the exterior of the container (11) so that the air in the second space (S22) is guided to the exterior of the container (11), and a plate member (27c) which forms, in the second space (S22), a region where the flow of the air blown from the interior fan (26) is blocked. The exhaust passage (46a) has an inlet at a location where the flow of the air blown from the interior fan (26) is blocked by the plate member (27c).

According to the first aspect of the invention, the air is circulated through the container (11) due to the rotation of the interior fan (26), and then cooled when passing through the evaporator (24). Further, the gas supply device (30) supplies the nitrogen-enriched air into the container, outside air is taken into the container (11) via the suction passage (47a), and the air in the container (11) is exhausted out of the container (11) via the exhaust passage (46a). In this manner, the composition of the air in the container is controlled to obtain a desired composition.

While the interior fan (26) is operating, the pressure in the first space (S21) on the suction side of the interior fan (26) is lower than the pressure outside the container (atmospheric pressure), and the pressure in the second space (S22) on the blowout side of the interior fan (26) is higher than the pressure outside the container (atmospheric pressure).

According to the first aspect of the invention, the inside air control system (60) of the container refrigeration apparatus includes the suction passage (47a) which allows the first space (S21) on the suction side of the interior fan (26) to communicate with the exterior of the container. This makes it possible to take the outside air into the container (11) due to the pressure difference produced between an inlet (exterior opening) and outlet (interior opening) of the suction passage (47a) while the interior fan (26) is rotating, without using any other transfer means.

Further, according to the first aspect of the invention, the inside air control system (60) of the container refrigeration apparatus includes the exhaust passage (46a) which allows the second space (S22) on the blowout side of the interior fan (26) to communicate with the exterior of the container. This makes it possible to exhaust the air in the container (11) out of the container due to the pressure difference produced between an inlet (interior opening) and outlet (exterior opening) of the exhaust passage (46a) while the interior fan (26) is rotating, without using any other transfer means.

Moreover, according to the first aspect of the invention, the inlet of the exhaust passage (46a) is at a location where the flow of the air blown from the interior fan (26) is blocked by the plate member (27c) provided in the second space (S22) on the blowout side of the interior fan (26). Thus, the air blown from the interior fan (26) does not flow into the exhaust passage (46a) without having circulated through the container. This may reduce the risk that the outside air taken into the first space (S21) on the suction side of the interior fan (26) would be exhausted out of the container without having been sufficiently mixed with the air in the container.

A second aspect of the invention is an embodiment of the first aspect of the invention. According to the second aspect of the invention, the interior fan (26) includes a rotary vane (27a) which is driven to rotate about a rotation axis, and a fan housing (27c) surrounding the rotary vane (27a), and the plate member (27c) is comprised of the fan housing (27c).

A third aspect of the invention is an embodiment of the second aspect of the invention. According to the third aspect of the invention, the interior fan (26) is an axial fan.

According to the second and third aspects of the invention, the fan housing (27c) surrounding the rotary vane (27a) of the interior fan (26) also functions as the plate member (27c) which blocks the flow of the air blown from the interior fan (26).

A fourth aspect of the invention is an embodiment of the second or third aspect of the invention. According to the fourth aspect of the invention, an inspection door (16A) which is openable and closable is attached to the casing (12) to be located on the side of the interior fan (26), and the exhaust passage (46a) is formed through the inspection door (16A).

According to the fourth aspect of the invention, the inspection door (16A) is provided on the side of the interior fan (26), and the exhaust passage (46a) is formed through the inspection door (16A). Thus, the mere provision of the inspection door (16A) allows the inlet of the exhaust passage (46a) to be at a location where the flow of the air blown from the interior fan (26) is blocked by the plate member (27c).

A fifth aspect of the invention is an embodiment of the fourth aspect of the invention. According to the fifth aspect of the invention, the inspection door (16A) faces both of the first and second spaces (S21) and (S22), and the suction passage (47a) is formed through the inspection door (16A).

According to the fifth aspect of the invention, the inspection door (16A) faces both of the first and second spaces (S21) and (S22), and the suction and exhaust passages (47a) and (46a) are formed through the inspection door (16A).

A sixth aspect of the invention is an embodiment of any one of the first to fifth aspects of the invention. According to the sixth aspect of the invention, the gas supply device (30) includes a supply passage (44) which supplies the nitrogen-enriched air to the second space (S22).

According to the sixth aspect of the invention, the gas supply device (30) supplies the nitrogen-enriched air to the second space (S22) on the blowout side of the interior fan (26). The inlet of the exhaust passage (46a) opens in the second space (S22) at a position where the flow of the air blown from the interior fan (26) is blocked by the plate member (27c) provided on the side of the interior fan (26). This substantially prevents the nitrogen-enriched air supplied to the second space (S22) on the blowout side of the interior fan (26) from flowing into the exhaust passage (46a) without having circulated through the container. That is, the nitrogen-enriched air is reliably supplied into the container.

A seventh aspect of the invention is an embodiment of any one of the first to fifth aspects of the invention. According to the seventh aspect of the invention, the gas supply device (30) includes a supply passage (44) which supplies the nitrogen-enriched air to the first space (S21).

According to the seventh aspect of the invention, the gas supply device (30) supplies the nitrogen-enriched air to the first space (S21) on the suction side of the interior fan (26). The nitrogen-enriched air supplied to the first space (S21) is sucked into the interior fan (26), and then blown to the second space (S22). The inlet of the exhaust passage (46a) opens in the second space (S22) at a location where the flow of the air blown from the interior fan (26) is blocked by the plate member (27c) provided on the side of the interior fan (26). This may reduce the risk that the nitrogen-enriched air supplied to the first space (S21) on the suction side of the interior fan (26) would be exhausted out of the container via the exhaust passage (46a) without having been sufficiently mixed with the air in the container.

An eighth aspect of the invention is an embodiment of any one of the first to seventh aspects of the invention. According to the eighth aspect of the invention, the container refrigeration apparatus further includes: an oxygen sensor (51) which measures an oxygen concentration of the air in the container (11); a carbon dioxide sensor (52) which measures a carbon dioxide concentration of the air in the container (11); an air passage (58) which allows the first and second spaces (S21) and (S22) to communicate with each other so that the air is guided from the second space (S22) to the first space (S21) while the interior fan (26) is rotating, and which is connected to the oxygen sensor (51) and the carbon dioxide sensor (52) to measure the oxygen concentration and the carbon dioxide concentration of the air; and a blocking member (53) which forms, in the second space (S22), a region where the flow of the air blown from the interior fan (26) is blocked. The air passage (58) has an inlet (54) at a location where the flow of the air blown from the interior fan (26) is blocked by the blocking member (53).

According to the eighth aspect of the invention, the air passage (58) is provided to allow the second space (S22) on the blowout side of the interior fan (26) to communicate with the first space (S21) on the suction side of the interior fan (26). As a result, a pressure difference is produced between one end of the air passage (58) in the second space (S22) and the other end of the air passage (58) in the first space (S21) while the interior fan (26) is rotating. This pressure difference causes the air to travel from the one end of the air passage (58) to the other, without using any other transfer means.

Further, according to the eighth aspect of the invention, the inlet of the air passage (58) is at a location where the flow of the air blown from the interior fan (26) is blocked by the blocking member (53) provided in the second space (S22) on the blowout side of the interior fan (26). Thus, the air blown from the interior fan (26) does not flow into the air passage (58) without having circulated through the container. This may reduce the risk that the outside air taken into the first space (S21) on the suction side of the interior fan

(26) would flow into the air passage (58) without having been sufficiently mixed with the air in the container.

Advantages of the Invention

According to the first aspect of the invention, the exhaust passage (46a) has the inlet at a location where the flow of the air blown from the interior fan (26) is blocked by the plate member (27c) provided in the second space (S22) on the blowout side of the interior fan (26). Thus, dynamic pressure becomes lower and static pressure becomes higher around the inlet of the exhaust passage (46a). This may substantially prevent the air blown from the interior fan (26) from flowing into the exhaust passage (46a) without having circulated through the container. This configuration may reduce the risk that the outside air taken into the first space (S21) on the suction side of the interior fans (26) would be exhausted out of the container via the exhaust passage (46a) without having been sufficiently mixed with the air in the container. Consequently, the oxygen concentration and carbon dioxide concentration of the air in the container (11) may be controlled with high accuracy.

Further, according to the second and third aspects of the invention, the fan housing (27c) surrounding the rotary vane (27a) of the interior fan (26) also functions as the plate member (27c) which blocks the flow of the air blown from the interior fan (26). Thus, according to the second and third aspects of the invention, the outside air, which has been taken into the first space (S21) on the suction side of the interior fan (26) and has not yet been sufficiently mixed with the air in the container, may be prevented from being exhausted out of the container via the exhaust passage (46a), without providing any additional plate member, i.e., without increasing the parts count.

Moreover, according to the fourth aspect of the invention, the exhaust passage (46a) is formed through the inspection door (16A) provided on the side of the interior fan (26). As a result, the mere provision of the inspection door (16A) allows the inlet of the exhaust passage (46a) to be easily placed at a location where the flow of the air blown from the interior fan (26) is blocked by the plate member (27c).

In addition, according to the fifth aspect of the invention, the inspection door (16A) faces both of the first and second spaces (S21) and (S22), and the exhaust and intake passages (46a) and (47a) are formed through this inspection door (16A). Thus, the suction passage (47a) having an opening in the first space (S21) and the exhaust passage (46a) having an opening in the second space (S22) may be easily obtained by forming passages which penetrate the inspection door (16A) and allow the interior and exterior of the container to communicate with each other.

Further, according to the sixth aspect of the invention, the gas supply device (30) supplies the nitrogen-enriched air to the second space (S22) on the blowout side of the interior fan (26). According to this configuration, the nitrogen-enriched air supplied to the second space (S22) may possibly flow into the exhaust passage (46a) without having circulated through the container. However, according to the sixth aspect of the invention, the inlet of the exhaust passage (46a) is at a location where the flow of the air blown from the interior fan (26) is blocked by the plate member (27c) provided in the second space (S22) on the blowout side of the interior fan (26). Thus, even if the gas supply device (30) is configured to supply the nitrogen-enriched air to the second space (S22) on the blowout side of the interior fan (26), the nitrogen-enriched air supplied to the second space (S22) may be prevented from being exhausted out of the container via the exhaust passage (46a) without having been sufficiently mixed with the air in the container. Consequently, the oxygen concentration and carbon dioxide concentration of the air in the container (11) may be controlled with accuracy.

Furthermore, according to the seventh aspect of the invention, the gas supply device (30) is configured to supply the nitrogen-enriched air to the first space (S21) on the suction side of the interior fan (26). According to such a configuration, the nitrogen-enriched air supplied to the first space (S21) may possibly flow into the exhaust passage (46a) without having circulated through the container. However, according to the seventh aspect of the invention, the exhaust passage (46a) has the inlet at a location where the flow of the air blown from the interior fan (26) is blocked by the plate member (27c) provided in the second space (S22) on the blowout side of the interior fan (26). Thus, even if the gas supply device (30) is configured to supply the nitrogen-enriched air to the first space (S21) on the suction side of the interior fan (26), the nitrogen-enriched air supplied to the first space (S21) may substantially be prevented from being exhausted out of the container via the exhaust passage (46a) without having been sufficiently mixed with the air in the container. Consequently, the oxygen concentration and carbon dioxide concentration of the air in the container (11) may be controlled with accuracy.

According to the eighth aspect of the invention, the air passage (58) has the inlet at a location where the flow of the air blown from the interior fan (26) is blocked by the blocking member (53) provided in the second space (S22) on the blowout side of the interior fan (26). Thus, dynamic pressure becomes lower and static pressure becomes higher around the inlet of the air passage (58). This may substantially prevent the air blown from the interior fan (26) from flowing into the air passage (58) without having circulated through the container. This configuration may reduce the risk that the outside air taken into the first space (S21) on the suction side of the interior fan (26) would be guided to the oxygen sensor (51) and the carbon dioxide sensor (52) via the air passage (58) without having been sufficiently mixed with the air in the container. Consequently, the oxygen concentration and carbon dioxide concentration of the air in the container (11) may be controlled with high accuracy.

BRIEF DESCRIPTION OF THE DRAWINGS

FIG. 8 is a cross-sectional view illustrating a general configuration for a container refrigeration apparatus according to a second embodiment.

DESCRIPTION OF EMBODIMENTS

Embodiments of the present invention will be described with reference to the drawings. The embodiments to be described below are merely exemplary ones in nature, and do not intend to limit the scope, applications, and use of the present invention.

First Embodiment of the Present Invention

Figure 1:
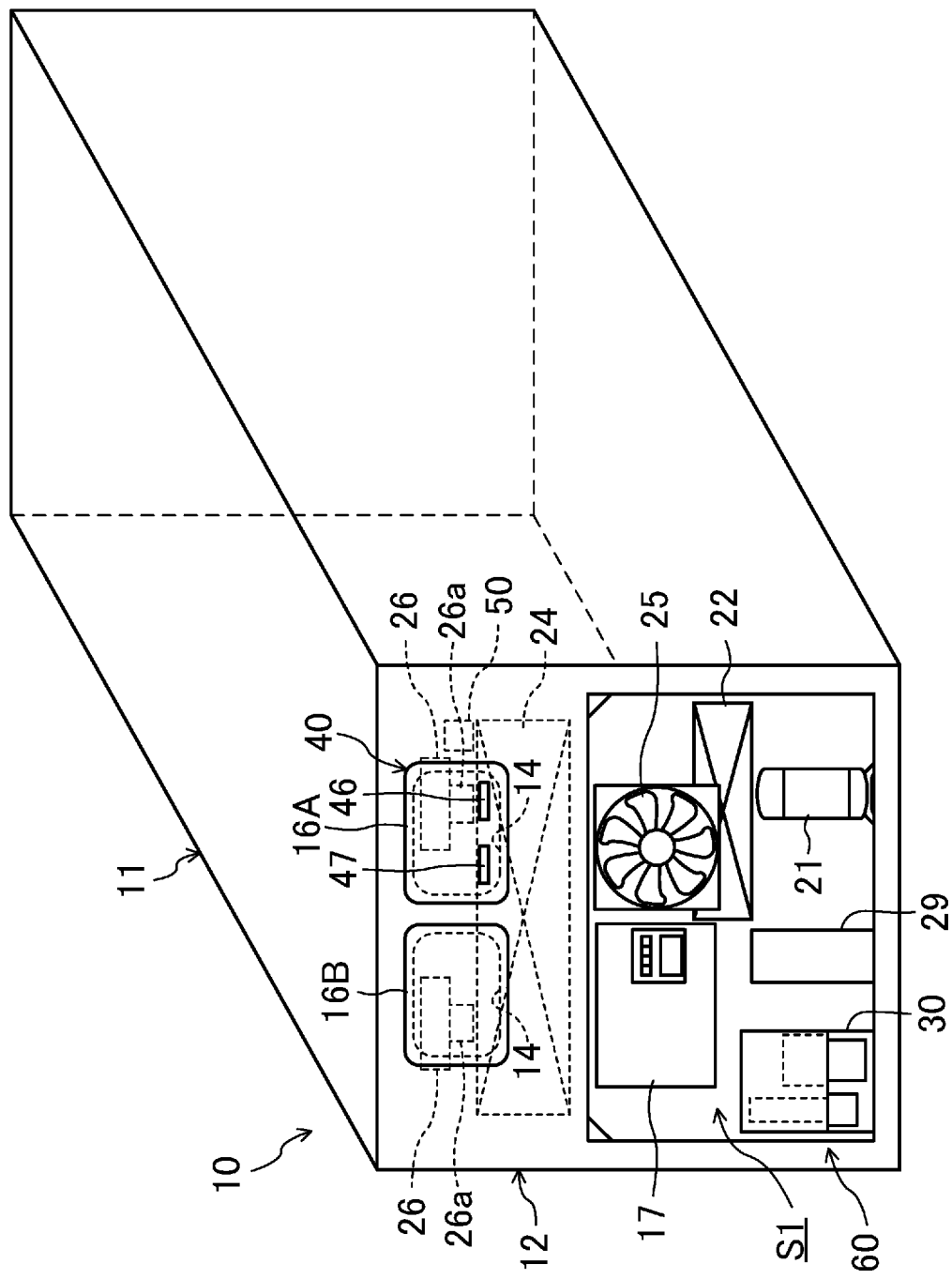
FIG. 1 is a perspective view of a container refrigeration apparatus according to a first embodiment, as viewed from the exterior of the container.
Figure 2:
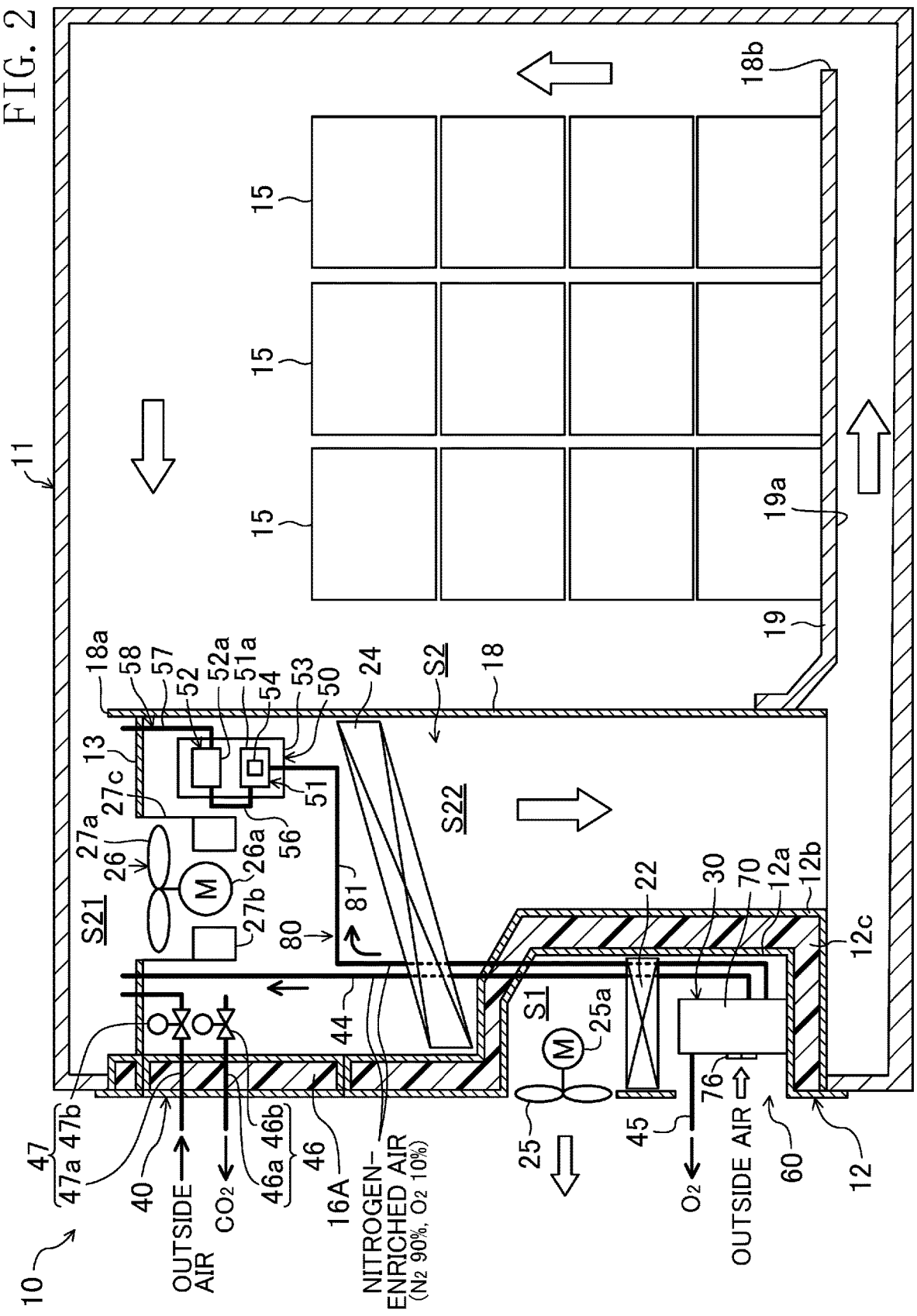
FIG. 2 is a cross-sectional view illustrating a general configuration for the container refrigeration apparatus according to the first embodiment.

As shown in FIGS. 1 and 2, a container refrigeration apparatus (10) is provided for a container (11) for use in e.g., marine transportation, and cools air in the container (11). Inside the container (11), boxed plants (15) are stored. The plants (15) perform respiration by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere system (CA system) (60), and is attached to close an opening of a container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of aluminum alloy, for example.

The exterior wall (12a) is attached to the periphery of the opening of the container (11) so as to close the opening of the container (11). The exterior wall (12a) is formed such that the lower part of the exterior wall (12a) protrudes into the container (11).

The interior wall (12b) is disposed so as to face the exterior wall (12a). The interior wall (12b) protrudes, just like the lower part of the exterior wall (12a), into the container (11). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall (16a), an interior wall (16b), and a thermal insulator (16c) (see FIG. 5). As will be described in detail later, the first access door (16A) which closes the access opening (14) on the right in FIG. 1 comprises an access door unit (40) together with an intake portion (47) and an exhaust portion (46) which will be described later.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to the upper end of the partition plate (18), and has an opening in which interior fans (26), which will be described later, are disposed. This partition wall (13) partitions the internal storage space (S2) into a first space (S21) on the suction side of the interior fans (26), and a second space (S22) on the blowout side of the interior fans (26). In this embodiment, the partition wall (13) partitions the internal storage space (S2) vertically such that the first space (S21) on the suction side is disposed above the second space (S22) on the blowout side.

In the interior of the container (11), a floorboard (19) is disposed with a gap left between the floorboard (19) and the bottom surface of the container (11). On the floorboard (19), boxed plants (15) are mounted. An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) blowing the air which has been cooled by the container refrigeration apparatus (10) into the container (11) is provided at an end of the floorboard (19) opposite from the open end of the container (11) (on the right side in FIG. 2).

<Refrigerant Circuit>

Figure 3:
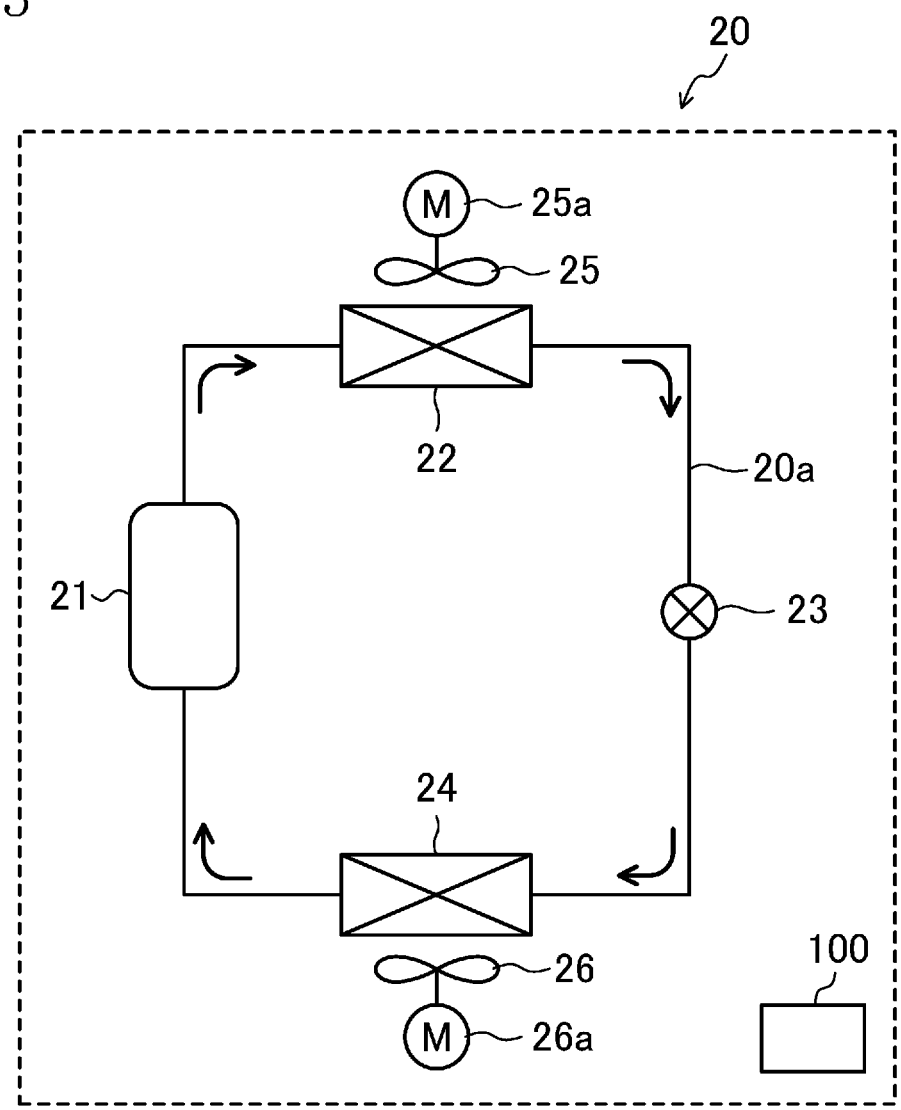
FIG. 3 is a piping system diagram illustrating a configuration for a refrigerant circuit according to the first embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An exterior fan (25) is disposed near the condenser (22). The exterior fan (25) is driven in rotation by an exterior fan motor (25a), guides the air in the exterior of the container (11) (outside air) into the external storage space (S1), and sends it to the condenser (22). In the condenser (22), heat is exchanged between a refrigerant compressed in the compressor (21) and flowing through the condenser (22) and the outside air sent from the exterior fan (25) to the condenser (22). In this embodiment, the exterior fan (25) is comprised of a propeller fan.

Two interior fans (26) are disposed near the evaporator (24). The interior fans (26) are driven in rotation by interior fan motors (26a), and guide the air in the container (11) through a suction port (18a) to blow the air into the evaporator (24). In the evaporator (24), heat is exchanged between a refrigerant flowing through the evaporator (24) and having its pressure decreased by the expansion valve (23) and the air in the container sent to the evaporator (24) by the interior fans (26).

As shown in FIG. 2, each of the interior fans (26) includes a propeller fan (rotary vane) (27a), a plurality of stationary vanes (27b), and a fan housing (27c). The propeller fan (27a) is coupled to the interior fan motor (26a), and driven in rotation by the interior fan motor (26a) about a rotation axis to blow the air in an axial direction. The plurality of stationary vanes (27b) is disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a) (see FIG. 5).

As shown in FIG. 1, the compressor (21) and the condenser (22) are housed in the external storage space (S1). The exterior fan (25) is disposed above the condenser (22). In the external storage space (S1), an electrical component box (17) is disposed adjacent to the exterior fan (25), and an inverter box (29) housing a driver circuit, which drives the compressor (21) at a variable velocity, is disposed below the electrical component box (17).

On the other hand, as shown in FIG. 2, the evaporator (24) is housed in the internal storage space (S2). The two interior fans (26) are disposed above the evaporator (24) in the internal storage space (S2) and arranged side by side in the width direction of the casing (12).

<CA System>

Figure 4:
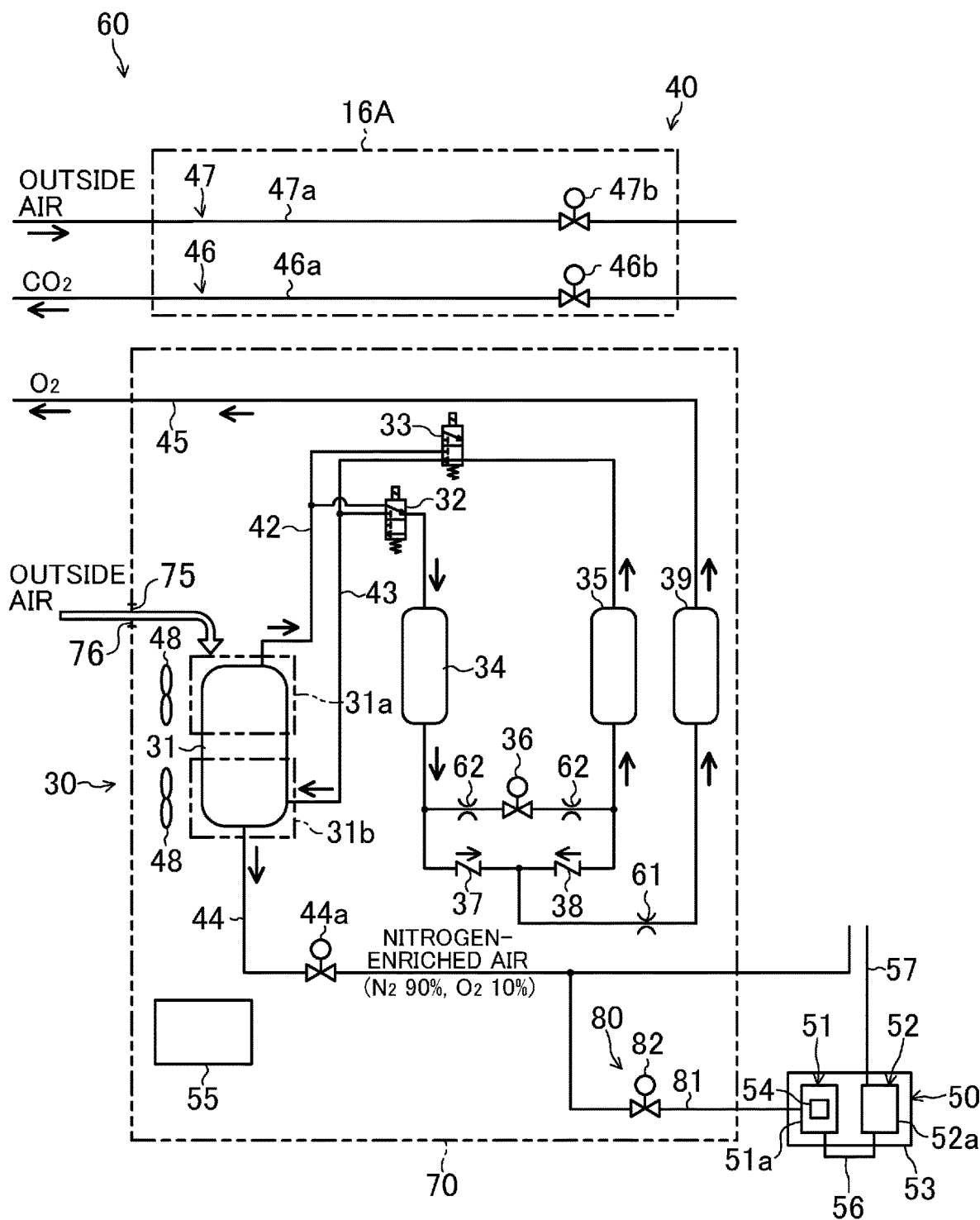
FIG. 4 is a piping system diagram illustrating a configuration for a CA system of the container refrigeration apparatus according to the first embodiment.

As shown in FIG. 4, the CA system (60) includes a gas supply device (30), an access door unit (40), a sensor unit (50), a measurement unit (80), and a concentration controller (55), and controls the oxygen concentration and carbon dioxide concentration of the air in the container (11). The term "concentration" to be used in the following description always indicates a "volumetric concentration."

[Gas Supply Device]

The gas supply device (30) produces nitrogen-enriched air with a low oxygen concentration to be supplied to the interior of the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air pump (31), first and second directional control valves (32) and (33), first and second adsorption columns (34) and (35) each provided with an adsorbent for adsorbing nitrogen in the air, a purge valve (36), first and second check valves (37) and (38), an oxygen tank (39), and a unit case (70) housing these components. In this manner, the gas supply device (30) forms a single unit with these components housed in the unit case (70), and is configured to be attached later to the container refrigeration apparatus (10).

The air pump (31) is provided in the unit case (70), and sucks the outside air from the exterior to the interior of the unit case (70) through an air inlet port (75) formed through the unit case (70) to compress the air. This air pump (31) includes a pressurizer (31a) which pressurizes the first and second adsorption columns (34) and (35) by supplying the columns (34, 35) with the compressed air through a discharge passage (42) to perform an adsorption operation for adsorbing nitrogen in the air onto the adsorbent. An air-permeable, waterproof membrane filter (76) is fitted in the air inlet port (75) of the unit case (70).

The air pump (31) further includes a depressurizer (31b) which depressurizes the first and second adsorption columns (34) and (35) by sucking the air from the columns (34, 35) through a suction passage (43) to perform a desorption operation for desorbing nitrogen from the adsorbent. It is recommended that the depressurizer (31b) be configured to reduce the internal pressure of each of the first and second adsorption columns (34) and (35) to a negative pressure (i.e., a pressure lower than the atmospheric pressure) during the desorption operation.

The pressurizer (31a) and depressurizer (31b) of the air pump (31) are configured as oil-less pumps without lubricant oil. Specifically, suppose that oil is used in the pump of the pressurizer (31a). In such a situation, when the first and second adsorption columns (34) and (35) are pressurized by being supplied with the compressed air, the oil included in the compressed air is adsorbed onto the adsorbent, resulting in a decreased adsorption performance of the adsorbent.

On the other hand, if oil is used in the pump of the depressurizer (31b), the oil is supplied to the interior of the container (11) together with the nitrogen-enriched air containing nitrogen desorbed from the first and second adsorption columns (34) and (35). That is to say, in that case, the nitrogen-enriched air is supplied to the interior of the container (11) loaded with plants (15) with an oily smell.

Thus, this embodiment is configured to overcome such a disadvantage by implementing the pressurizer (31a) and depressurizer (31b) of the air pump (31) as oil-less pumps.

Two blower fans (48) are disposed on the side of the air pump (31) to cool the air pump (31) by blowing air to the air pump (31).

The first and second directional control valves (32) and (33) are used to alternately switch the targets of adsorption operation or desorption operation between the first and second adsorption columns (34) and (35).

The first directional control valve (32) is connected to the discharge port of the pressurizer (31a), the suction port of the depressurizer (31b), and the top of the first adsorption column (34). The first directional control valve (32) switches between a state where the first adsorption column (34) is allowed to communicate with the pressurizer (31a) to be blocked from the depressurizer (31b) (the state shown in FIG. 4), and a state where the first adsorption column (34) is allowed to communicate with the depressurizer (31b) to be blocked from the pressurizer (31a).

The second directional control valve (33) is connected to the discharge port of the pressurizer (31a), the suction port of the depressurizer (31b), and the top of the second adsorption column (35). This second directional control valve (33) switches between a state where the second adsorption column (35) is allowed to communicate with the pressurizer (31a) to be blocked from the depressurizer (31b), and a second state where the second adsorption column (35) is allowed to communicate with the depressurizer (31b) to be blocked from the pressurizer (31a) (the state shown in FIG. 4).

In the state shown in FIG. 4, the adsorption operation is performed on the first adsorption column (34) by the pressurizer (31a), and the desorption operation is performed on the second adsorption column (35) by the depressurizer (31b). Although not shown, if the positions of the first and second directional control valves (32) and (33) are opposite from those in FIG. 4, the adsorption operation is performed on the second adsorption column (35) by the pressurizer (31a), and the desorption operation is performed on the first adsorption column (34) by the depressurizer (31b). The gas supply device (30) repeatedly performs the above-described process while interchanging the targets of the adsorption and desorption operations between the first and second adsorption columns (34) and (35), thereby continuously producing nitrogen-enriched air in a stable manner. This switching operation is controlled by the concentration controller (55).

The first and second adsorption columns (34) and (35) are configured as cylindrical members filled with an adsorbent, and are disposed upright (i.e., disposed such that each axis direction thereof is a vertical direction). The first and second adsorption columns (34) and (35) produce oxygen-enriched air by adsorbing nitrogen in the compressed air supplied from the air pump (31). The adsorbent that fills the first and second adsorption columns (34) and (35) absorbs nitrogen in a state where the adsorption columns (34, 35) are pressurized, and desorbs nitrogen in a state where these adsorption columns (34, 35) are depressurized.

The adsorbent that fills the first and second adsorption columns (34) and (35) may be comprised of porous zeolite having pores with a diameter that is, e.g., smaller than the diameter of nitrogen molecules (3.0 angstrom) and larger than the diameter of oxygen molecules (2.8 angstrom). By using zeolite having pores of such a diameter as adsorbent, nitrogen in the air may be absorbed.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed, together with nitrogen, from the adsorbent as a result of the desorption operation. Consequently, nitrogen-enriched air including moisture is supplied to the interior of the container (11), thus increasing the humidity in the interior of the container (11). Furthermore, the adsorbent is regenerated, and therefore, may have its life extended.

If the first and second adsorption columns (34) and (35) are depressurized by the air pump (31), the nitrogen adsorbed onto the adsorbent is desorbed. This produces nitrogen-enriched air that has had its oxygen concentration lowered by including more nitrogen than the outside air does. In this embodiment, this nitrogen-enriched air may be 90% nitrogen and 10% oxygen, for example.

In a conventional device of producing a high-purity nitrogen gas having a nitrogen concentration of more than 99% using a membrane separator, the pressurization pressure of an air pump is set to a relatively high value (of about 827.6 kPa, for example).

In contrast, the gas supply device (30) according to this embodiment may produce nitrogen-enriched air which is 90% nitrogen and 10% oxygen. Thus, it is sufficient to set the pressurization pressure of the air pump (31) to be a relatively low value (of about 150 kPa, for example). Accordingly, in the gas supply device (30) of this embodiment, the pressurization pressure of the air pump (31) does not need to be as high as in the conventional one. As a result, the size of the pressurizer (31a) may be reduced.

The respective lower ends of the first and second adsorption columns (34) and (35) (functioning as an outlet port during pressurization and an inlet port during depressurization) communicate with each other via the purge valve (36). An orifice (62) is attached to the pipe between the lower end of the first adsorption column (34) and the purge valve (36), and another orifice (62) is attached to the pipe between the lower end of the second adsorption column (35) and the purge valve (36).

The purge valve (36) is used to introduce a predetermined amount of the oxygen-enriched air into an adsorption column on the depressurization side (the second adsorption column (35) in FIG. 4) from an adsorption column on the pressurization side (the first adsorption column (34) in FIG. 4) to support the release of nitrogen from the adsorbent of the adsorption columns (35, 34) on the depressurization side. The concentration controller (55) controls an opening/closing operation of the purge valve (36).

The oxygen tank (39) temporarily retains oxygen-enriched air produced in the first and second adsorption columns (34) and (35). The inlet port of the oxygen tank (39) is connected to the lower ends of the first and second adsorption columns (34) and (35) via the pipe. A first check valve (37) preventing backflow of the air from the oxygen tank (39) to the first adsorption column (34) is provided for the pipe connecting the first adsorption column (34) and the oxygen tank (39). On the other hand, a second check valve (38) preventing backflow of the air from the oxygen tank (39) to the second adsorption column (35) is provided for the pipe connecting the second adsorption column (35) and the oxygen tank (39). An orifice (61) is provided between the oxygen tank (39) and the first and second check valves (37) and (38). The oxygen-enriched air produced in the first and second adsorption columns (34) and (35) is depressurized by the orifice (61), and is then temporarily retained in the oxygen tank (39).

In addition, the gas supply device (30) includes a supply passage (44) which supplies the nitrogen-enriched air sucked into the depressurizer (31b) of the air pump (31) into the container (11), and an oxygen exhaust passage (45) which discharges the oxygen-enriched air retained in the oxygen tank (39) out of the container (11).

The supply passage (44) has one end connected to the depressurizer (31b) of the air pump (31), and the other end opening in a first space (S21) on the suction side of the interior fans (26) in the internal storage space (S2). The supply passage (44) is provided with an electromagnetic valve (44a) for preventing backflow. The nitrogen-enriched air sucked into the depressurizer (31b) of the air pump (31) is supplied via the supply passage (44) into the container (11).

The oxygen exhaust passage (45) has one end connected to the outlet port of the oxygen tank (39), and the other end opening in the exterior of the container (11). The oxygen-enriched air retained in the oxygen tank (39) is exhausted out of the container (11) through the oxygen exhaust passage (45).

[Access Door Unit]

As described above, the access door unit (40) includes the first access door (16A), the intake portion (47) through which the outside air is sucked into the interior of the container (11), and the exhaust portion (46) through which the air in the container (11) is exhausted out of the container (11).

Figure 5:
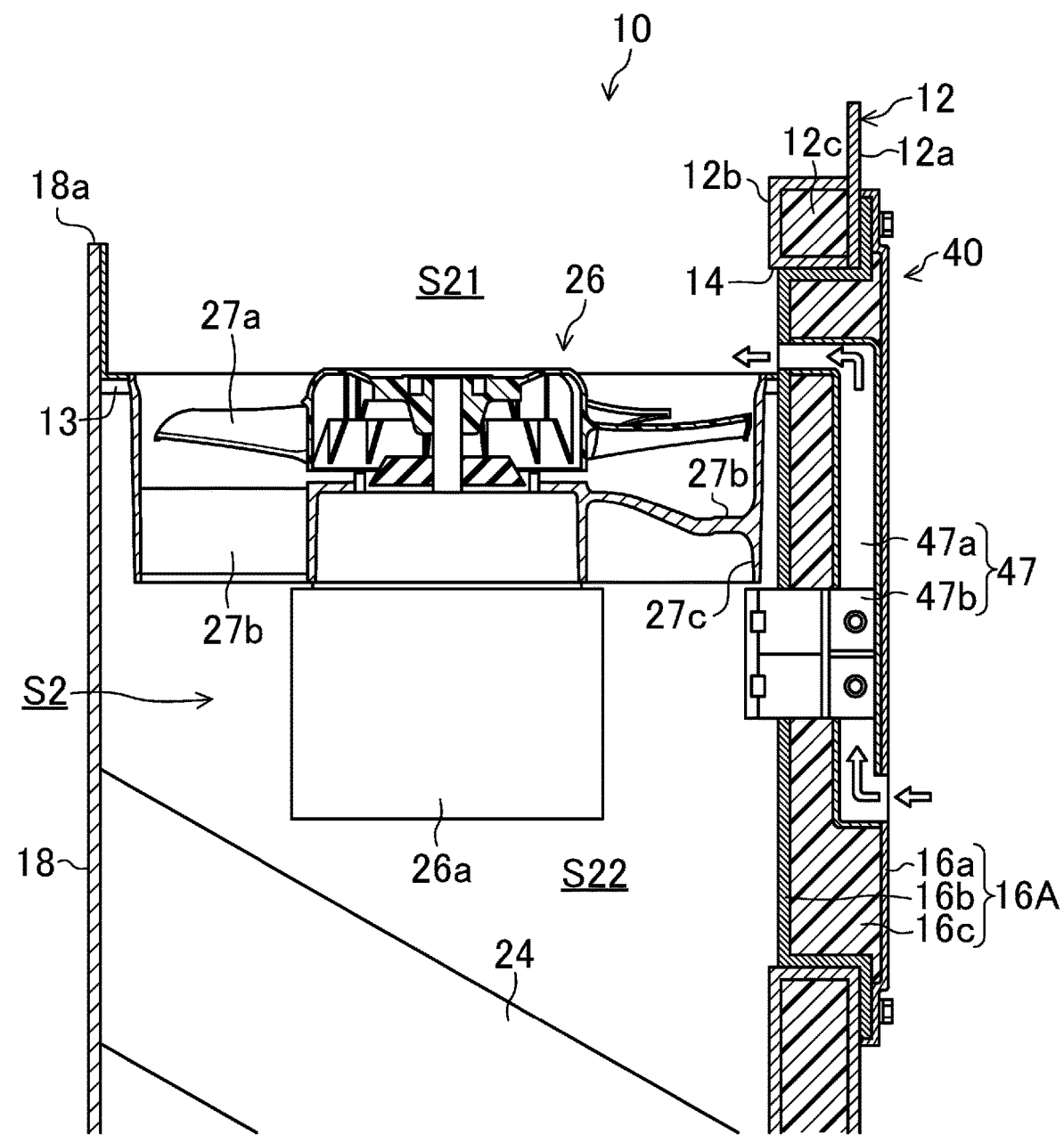
FIG. 5 is a cross-sectional view illustrating an intake duct provided through a first access door of the container refrigeration apparatus according to the first embodiment.
Figure 6:
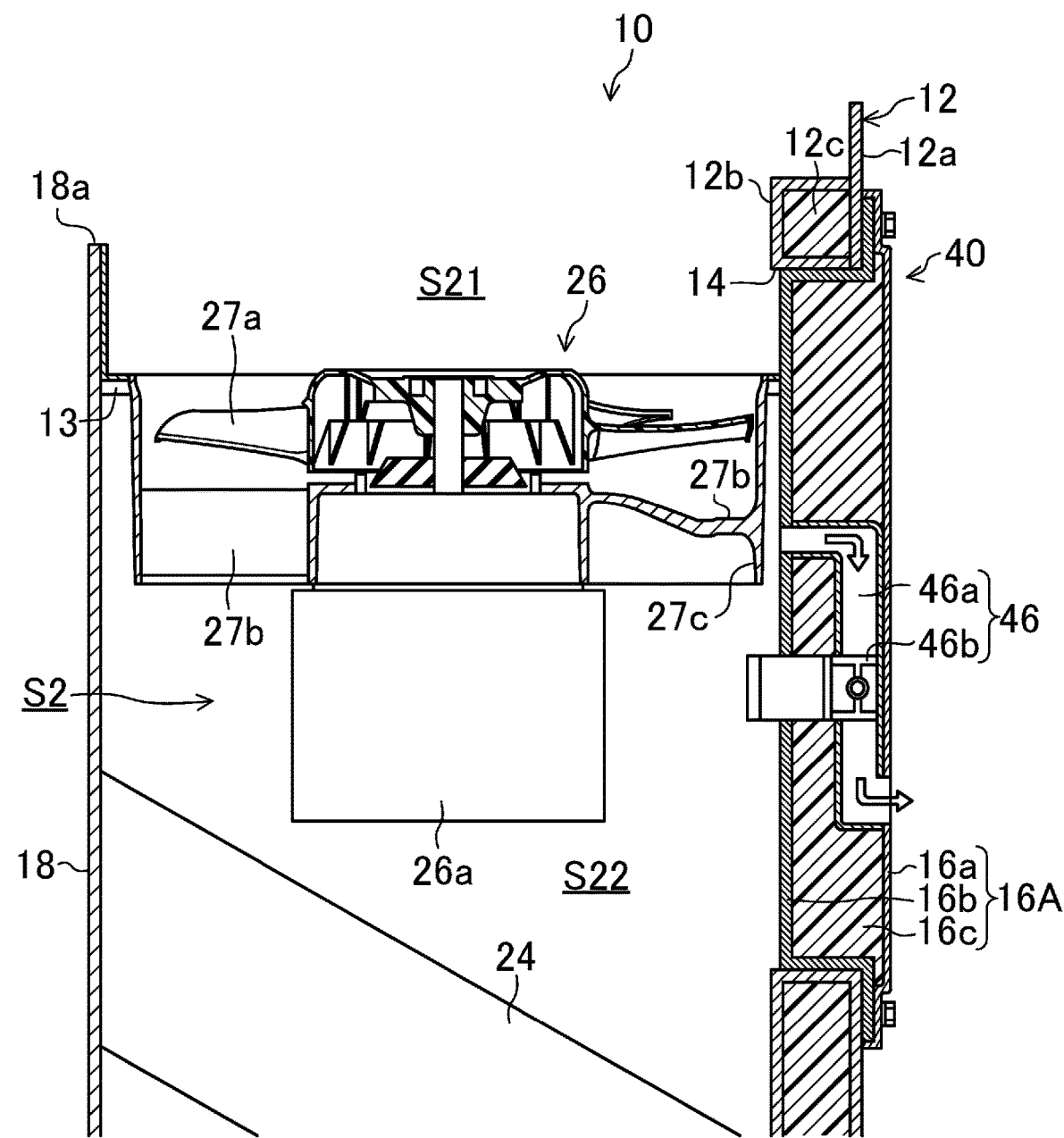
FIG. 6 is a cross-sectional view illustrating an exhaust duct provided through the first access door of the container refrigeration apparatus according to the first embodiment.

As shown in FIGS. 5 and 6, the first access door (16A) includes the exterior wall (16a), the interior wall (16b), and the thermal insulator (16c) as described above. The exterior wall (16a) is larger than the access opening (14) to which the first access door (16A) is attached, is located in the exterior of the container (11), and is configured to close the access opening (14) from the exterior of the container (11). The interior wall (16b) is attached to an inner surface of the exterior wall (16a), and has an inner portion (except for an outer peripheral portion thereof) protruding into the container. The protruding portion of the interior wall (16b) is formed smaller than the access opening (14) such that the interior wall (16b) can be fitted into the access opening (14). The thermal insulator (16c) is provided in a space between the exterior and interior walls (16a) and (16b).

The first access door (16A) is bolted to a peripheral portion of the access opening (14) formed through the casing (12). That is, the first access door (16A) is detachably bolted to the casing (12). The access opening (14) is formed on the side of the interior fans (26) in the casing (12). Thus, the first access door (16A) is positioned on the side of the interior fans (26) in the casing (12). Further, the first access door (16A) faces both of the first space (S21) on the suction side of the interior fans (26) and the second space (S22) on the blowout side of the interior fans (26).

As shown in FIG. 5, the intake portion (47) includes an intake duct (intake passage) (47a) connecting the internal storage space (S2) and the external space of the container, and an intake valve (47b) connected to the intake duct (47a).

The intake duct (47a) is formed inside the first access door (16A). Specifically, the intake duct (47a) is made of a duct member connecting the openings formed respectively through the exterior and interior walls (16a) and (16b) of the first access door (16A). The intake duct (47a) is formed inside the first access door (16A) such that a portion closer to an inlet (the exterior opening) extends along an inner surface of the exterior wall (16a). The intake duct (47a) has the inlet (the exterior opening) which opens at a lower portion of the exterior wall (16a), and an outlet (the interior opening) which opens at an upper portion of the interior wall (16b) to face the first space (S21) on the suction side of the interior fans (26).

The intake valve (47b) is arranged halfway in the intake duct (47a), and is comprised of an electromagnetic valve switching between an open state where the air is allowed to flow through the intake duct (47a), and a closed state where the flow of the air in the intake duct (47a) is blocked. The concentration controller (55) controls an opening/closing operation of the intake valve (47b).

On the other hand, as shown in FIG. 6, the exhaust portion (46) includes an exhaust duct (exhaust passage) (46a) connecting the internal storage space (S2) and the external space of the container, and an exhaust valve (46b) connected to the exhaust duct (46a).

The exhaust duct (46a) is formed inside the first access door (16A). Specifically, the exhaust duct (46a) is made of a duct member connecting the openings formed respectively through the exterior and interior walls (16a) and (16b) of the first access door (16A). The exhaust duct (46a) is formed inside the first access door (16A) such that a portion closer to an outlet (the exterior opening) extends along an inner surface of the exterior wall (16a). The exhaust duct (46a) has an inlet (the interior opening) which opens at a position higher than the vertical center of the interior wall (16b), and the outlet (the exterior opening) which opens at a lower portion of the exterior wall (16a).

The exhaust valve (46b) is arranged halfway in the exhaust duct (46a), and is comprised of an electromagnetic valve switching between an open state where the air is allowed to flow through the exhaust duct (46a), and a closed state where the flow of the air in the exhaust duct (46a) is blocked. The concentration controller (55) controls an opening/closing operation of the exhaust valve (46b).

In this configuration, due to the rotation of the interior fans (26), the outside air is taken from the exterior of the container to the internal storage space (S2) through the intake portion (47), and the air in the internal storage space (S2) communicating with the interior of the container, i.e., the inside air, is exhausted out of the container through the exhaust portion (46).

Specifically, when the interior fans (26) are rotating, the pressure in the first space (S21) on the suction side of the fans becomes lower than the pressure in the external space of the container (atmospheric pressure). As a result, when the intake valve (47b) is open, the outside air is sucked into the internal storage space (S2) through the intake duct (47a) due to the pressure difference between the two ends of the intake duct (47a) (pressure difference between the external space of the container and the first space (S21)). On the other hand, when the interior fans (26) are rotating, the pressure in the second space (S22) on the blowout side of the fans becomes higher than the pressure in the external space of the container (atmospheric pressure). As a result, when the exhaust valve (46b) is open, the air in the internal storage space (S2) communicating with the interior of the container (inside air) is exhausted via the exhaust duct (46a) to the external space of the container due to the pressure difference between the two ends of the exhaust duct (46a) (pressure difference between the external space of the container and the second space (S22)).

[Sensor Unit]

As shown in FIG. 2, the sensor unit (50) is provided in the second space (S22) which is on the blowout side of the interior fans (26) in the internal storage space (S2). As shown in FIG. 1, the sensor unit (50) is attached to an inner surface of the casing (12) on the side of the access opening (14), to which the first access door (16A) is attached.

Figure 7:
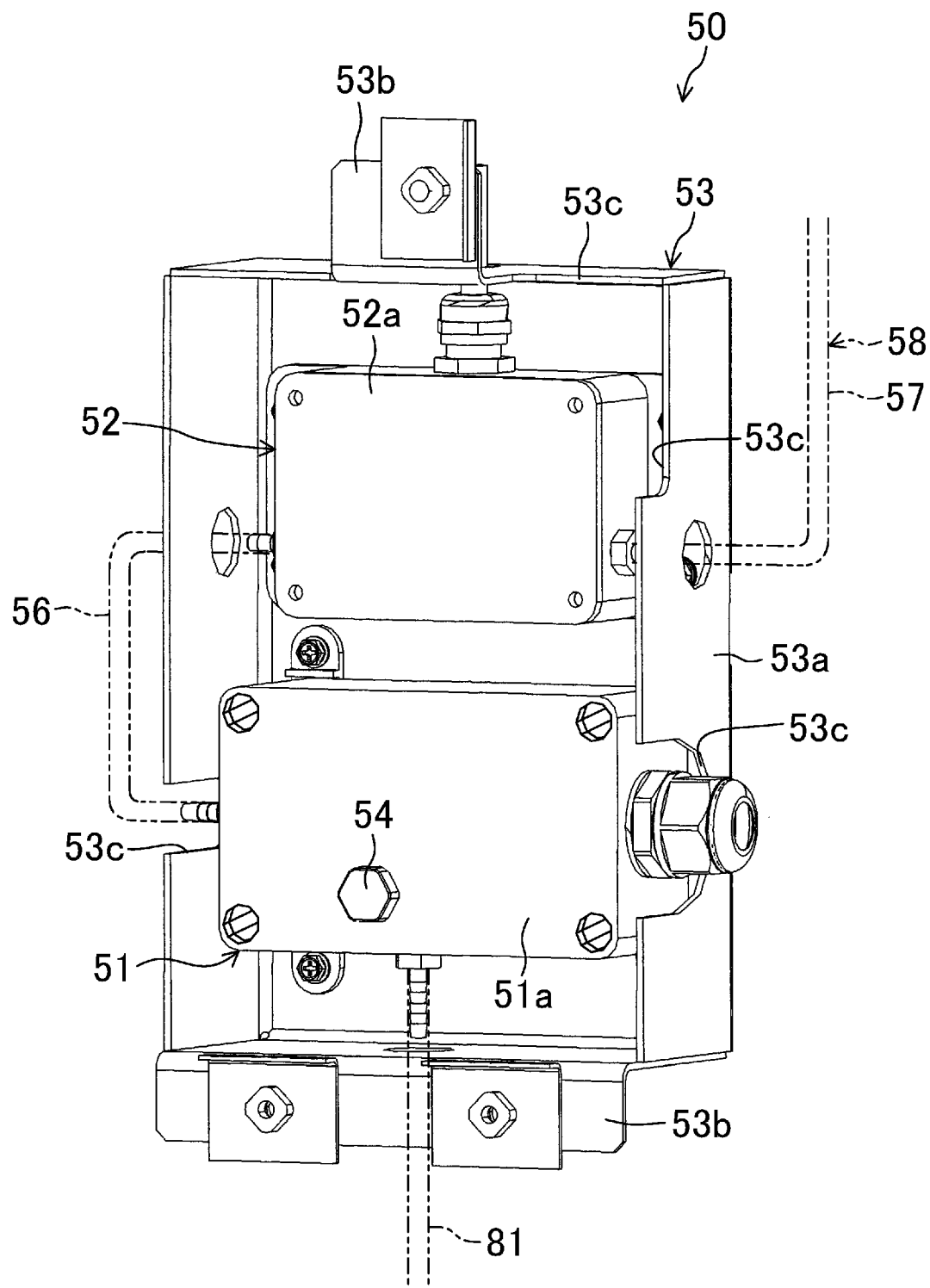
FIG. 7 is a perspective view illustrating a sensor unit of the container refrigeration apparatus according to the first embodiment.

As shown in FIG. 7, the sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic cell-type sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54) is attached.

The membrane filter (54) is an air-permeable, waterproof filter. This membrane filter (54) allows the second space (S22) of the internal storage space (S2) to communicate with the internal space of the oxygen sensor box (51a), and prevents, when the air in the container passes from the second space (S22) to the internal space of the oxygen sensor box (51a), moisture in the air from entering the internal space.

Further, a branch pipe (81) of a measurement unit (80), which will be described later, is coupled via a connector (pipe joint) to a lower surface of the oxygen sensor box (51a). In addition, the connection pipe (56) is coupled via a connector to one of the side surfaces of the oxygen sensor box (51a).

The carbon dioxide sensor (52) has a carbon dioxide sensor box (52a). The carbon dioxide sensor (52) is a non-dispersive infrared sensor which radiates infrared rays to the gas in the carbon dioxide sensor box (52a) to measure an absorption amount of infrared rays having a wavelength specific to carbon dioxide, thereby measuring the carbon dioxide concentration in the gas. The connection pipe (56) is coupled to via a connector one side surface of the carbon dioxide sensor box (52a). Furthermore, the exhaust pipe (57) is coupled via a connector to the other side surface of the carbon dioxide sensor box (52a).

The fixing member (53) includes a box-shaped body (53a) with one face open, and a fixing part (53b) which extends outward from an outer edge of the body (53a) along the open face and is bolted to the casing (12). A plurality of notches (53c) which allow the interior and exterior of the body (53a) to communicate with each other are formed through three of the side faces surrounding the open face of the body (53a). The oxygen sensor box (51a) and the carbon dioxide sensor box (52a) are fixed to the face of the body (53a) opposite to the open face. The fixing member (53) is fixed to the casing (12) with the oxygen sensor (51) and the carbon dioxide sensor (52) attached thereto.

According to this configuration, the internal space of the fixing member (53) communicates with the second space (S22) on the blowout side of the interior fans (26) through the plurality of notches (53c), while blocking the flow of the air blown from the interior fans (26). In other words, the fixing member (53) comprises a blocking member forming a blocked region in the second space (S22) where the flow of air blown from the interior fans (26) is blocked.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

Further, as described above, the exhaust pipe (57) has one end coupled to the other side surface of the carbon dioxide sensor box (52a), and the other end open near the suction port of the interior fans (26). That is, the exhaust pipe (57) allows the internal space of the carbon dioxide sensor box (52a) to communicate with the first space (S21) of the internal storage space (S2).

As can be seen, the internal space of the oxygen sensor box (51a) and the internal space of the carbon dioxide sensor box (52a) communicate with each other via the connection pipe (56), the internal space of the oxygen sensor box (51a) communicates with the second space (S22) of the internal storage space (S2) via the membrane filter (54), and the internal space of the carbon dioxide sensor box (52a) communicates with the first space (S21) of the internal storage space (S2) via the exhaust pipe (57). That is, the second and first spaces (S22) and (S21) of the internal storage space (S2) communicate with each other via an air passage (58) including the membrane filter (54), the internal space of the oxygen sensor box (51a), the connection pipe (56), the internal space of the carbon dioxide sensor box (52a), and the exhaust pipe (57). In other words, the oxygen sensor (51) and the carbon dioxide sensor (52) are connected to the air passage (58) which allows the first and second spaces (S21) and (S22) of the internal storage space (S2) to communicate with each other. Thus, in the sensor unit (50), when the interior fans (26) are rotating, the air in the container flows from the inlet (the membrane filter (54)) to outlet (the outlet end of the exhaust pipe (57)) of the air passage (58), and then the oxygen concentration and the carbon dioxide concentration are measured.

Specifically, when the interior fans (26) are rotating, the pressure of the first space (S21) on the suction side of the fans becomes lower than the pressure of the second space (S22) on the blowout side of the fans. Thus, when the interior fans (26) are rotating, due to the pressure difference between the first and second spaces (S21) and (S22), the air in the container flows from the second space (S22) toward the first space (S21) in the air passage (58) to which the oxygen sensor (51) and the carbon dioxide sensor (52) are connected. More particularly, first, the air in the second space (S22) flows via the membrane filter (54) into the internal space of the oxygen sensor box (51a), passes through the connection pipe (56), the internal space of the carbon dioxide sensor box (52a), and the exhaust pipe (57) in this order, and is discharged to the second space (S22). In this manner, the air in the container passes through the oxygen sensor (51) and the carbon dioxide sensor (52) in this order, and thus, the oxygen sensor (51) measures the oxygen concentration of the air in the container, and the carbon dioxide sensor (52) measures the carbon dioxide concentration of the air in the container.

As described above, the oxygen sensor (51) and the carbon dioxide sensor (52) are housed inside the fixing member (53), i.e., the blocked region where the flow of air blown from the interior fans (26) is blocked, and the inlet (the membrane filter (54)) of the air passage (58) connected to the oxygen sensor (51) and the carbon dioxide sensor (52) is housed in the fixing member (53) as well. In this configuration, the inlet of the air passage (58) is at a location where the flow of air blown from the interior fans (26) is blocked by the fixing member (53). Thus, the air blown from the interior fans (26) may be prevented from flowing directly into the air passage (58). In other words, the risk may be reduced that the outside air taken into the first space (S21) on the suction side of the interior fans (26) via the intake duct (47a) would flow into the air passage (58) without having been sufficiently mixed with the air in the container. As a result, the oxygen sensor (51) and the carbon dioxide sensor (52) accurately measure the oxygen and carbon dioxide concentrations in the air in the container.

For the maintenance of the container refrigeration apparatus (10), the components in the second space (S22) of the internal storage space (S2), such as the evaporator (24), may be washed with a high pressure cleaner. During the high pressure cleaning, water may possibly enter the air passage (58) having the inlet opening in the second space (S22).

In this embodiment, however, the membrane filter (54) at the inlet of the air passage (58) is provided on a surface of the oxygen sensor box (51a) closer to the exterior of the container. In addition, the oxygen sensor box (51a) is arranged to face the interior wall (12b) of the casing (12) with a small gap left between the interior wall (12b) and the surface of the oxygen sensor box (51a) closer to the exterior of the container. Therefore, the pressurized water may be prevented from flowing into the passage (58) during the high pressure cleaning. Further, in this configuration, not only the pressurized water but also dirt or any other foreign matter may also be prevented from entering the air passage (58).

Moreover, as described above, the oxygen sensor box (51a) and the carbon dioxide sensor box (52a) are covered with the fixing member (53) made of sheet metal. Connecters attached to the oxygen sensor box (51a) and the carbon dioxide sensor box (52a) are also covered with the fixing member (53). This may prevent the pressurized water from directly hitting the connectors during the high pressure cleaning. If the pressurized water directly hits the connectors, tubes comprising the branch pipe (81), the connection pipe (56), and the exhaust pipe (57) inserted into the connectors may possibly be detached. However, since the pressurized water is prevented from directly hitting the connector as described above, the risk that the tubes would be detached from the connectors may be reduced.

[Measurement Unit]

The measurement unit (80) includes the branch pipe (81) and a measurement on-off valve (82), and is configured to diverge, and guide to the oxygen concentration sensor (51), part of nitrogen-enriched air produced in the gas supply device (30) and passing through the supply passage (44).

Specifically, the branch pipe (81) has one end connected to the supply passage (44), and the other end coupled to the oxygen sensor box (51a) of the oxygen sensor (51). According to this configuration, the branch pipe (81) allows the supply passage (44) to communicate with the internal space of the oxygen sensor box (51a). In this embodiment, the branch pipe (81) is branched from the supply passage (44) in the unit case (70) and extends from the interior to the exterior of the unit case (70).

The measurement on-off valve (82) is provided for the branch pipe (81) in the unit case (70). The measurement on-off valve (82) is comprised of an electromagnetic valve switching between an open state where the flow of nitrogen-enriched air in the branch pipe (81) is allowed, and a closed state where the flow of the nitrogen-enriched air in the branch pipe (81) is blocked. The opening/closing operation of the measurement on-off valve (82) is controlled by the concentration controller (55). As will be described in detail later, the measurement on-off valve (82) is open only when a supply air measurement operation to be described later is performed, and is closed in the other modes.

[Concentration Controller]

The concentration controller (55) is configured to perform a concentration control operation for controlling the oxygen concentration and carbon dioxide concentration of the air in the container (11) to desired concentrations, respectively. Specifically, the concentration controller (55) controls the operation of the gas supply device (30), the intake portion (47), and the exhaust portion (46) based on measurement results obtained by the oxygen concentration sensor (51) and the carbon dioxide concentration sensor (52) so that the oxygen concentration and carbon dioxide concentration of the air in the container (11) are controlled to desired target concentrations (e.g., 5% oxygen and 5% carbon dioxide).

According to the above-described configuration, the gas supply device (30), access door unit (40), and sensor unit (50) of the CA system (60) are comprised as separate units, respectively. That is, the CA system (60) includes components configured as independent units so that they can easily be retrofitted onto an existing container refrigeration apparatus (10).

In this embodiment, the measurement unit (80) is configured as a single unit with the gas supply device (30). Further, the measurement unit (80) provided for the CA system (60) in this embodiment may be omitted.

—Operations—
<Cooling Operation>

In this embodiment, a temperature controller (100) shown in FIG. 3 performs a cooling operation for cooling the air in the container (11).

During the cooling operation, the temperature controller (100) controls the operation of the compressor (21), the expansion valve (23), the exterior and interior fans (25) and (26) based on measurement results provided by a temperature sensor (not shown) so that the temperature of the air in the container reaches a desired target temperature. In this case, the refrigerant circuit (20) allows the refrigerant to circulate to perform a vapor compression refrigeration cycle. Then, the air in the container (11) guided to the internal storage space (S2) by the interior fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

<Concentration Control Operation>

Further, in this embodiment, the concentration controller (55) shown in FIG. 4 performs a concentration control operation for controlling the oxygen concentration and carbon dioxide concentration of the air in the container (11) to desired target concentrations (e.g., 5% oxygen and 5% carbon dioxide). During the concentration control operation, the concentration controller (55) controls the operation of the gas supply device (30), the intake portion (47), and the exhaust portion (46) based on the measurement results of the oxygen sensor (51) and the carbon dioxide sensor (52) so as to control the oxygen concentration and carbon dioxide concentration of the air in the container (11) to desired target concentrations, respectively. Further, the concentration controller (55) instructs the measurement on-off valve (82) to close. As a result, the oxygen sensor (51) and the carbon dioxide sensor (52) receive the air in the container blown from the interior fans (26), and measure the oxygen concentration and carbon dioxide concentration of the air in the container. An operation for controlling the oxygen concentration and an operation for controlling the carbon dioxide concentration will be described in detail below.

[Oxygen Concentration Control Operation]

First, the concentration controller (55) determines whether the oxygen concentration of the air in the container measured by the oxygen sensor (51) is higher than that of the nitrogen-enriched air (consisting of 10% oxygen). If the oxygen concentration of the air in the container is higher than that of the nitrogen-enriched air, the concentration controller (55) starts the operation of the gas supply device (30). As a result, the nitrogen-enriched air (consisting of 90% nitrogen and 10% oxygen) is produced in the gas supply device (30), and supplied into the container (11). That is to say, an operation for reducing the oxygen concentration of the air in the container (11) is performed.

Thereafter, the concentration controller (55) determines whether the oxygen concentration measured by the oxygen sensor (51) has decreased to be equal to or less than the oxygen concentration (consisting of 10% oxygen) of the nitrogen-enriched air. If the oxygen concentration of the air in the container has decreased to be equal to or less than that of the nitrogen-enriched air, the concentration controller (55) stops the operation of the gas supply device (30). That is, supply of the nitrogen-enriched air into the container (11) is stopped.

Note that plants (15) stored in the interior of the container (11) perform respiration. Thus, the plants (15) always absorb oxygen from the interior of the container (11), and release carbon dioxide to the interior of the container (11). Therefore, if the supply of the nitrogen-enriched air into the container (11) is stopped, the oxygen concentration of the air in the container (11) keeps decreasing.

Next, the concentration controller (55) determines whether the oxygen concentration in the air in the container measured by the oxygen sensor (51) has decreased to be less than a target oxygen concentration (5%). If the oxygen concentration in the air in the container has decreased to be less than the target concentration, the concentration controller (55) restarts the operation of the gas supply device (30), or opens the intake valve (47b) of the intake portion (47) to supply the outside air having a higher oxygen concentration than the nitrogen-enriched air via the intake duct (47a) to the interior of the container (11). That is to say, an operation for increasing the oxygen concentration in the air in the container (11) is performed by restarting the supply of the nitrogen-enriched air to the interior of the container (11), or by taking the outside air into the container (11). Note that the supply of the nitrogen-enriched air into the container (11) and the intake of the outside air may be performed simultaneously. Moreover, simultaneously with the supply of the nitrogen-enriched air and the intake of the outside air, the exhaust valve (46b) of the exhaust portion (46) may be opened so that the air in the container is exhausted out of the container via the exhaust duct (46a).

Thereafter, the series of process steps described above will be repeatedly performed all over again. According to this operation, the oxygen concentration of the air in the container (11) is controlled to be within a range between the target oxygen concentration (5%) and the oxygen concentration (10%) of the nitrogen-enriched air produced by the gas supply device (30).

In this embodiment, if the plants (15) are bananas, the target concentration of the oxygen concentration is set to 5%. If the plants (15) are avocados, however, it is recommended that the target concentration be set to 3%.

[Carbon Dioxide Concentration Control Operation]

First, the concentration controller (55) determines whether the carbon dioxide concentration of the air in the container measured by the carbon dioxide sensor (52) is higher than a predetermined target concentration (5%). If the carbon dioxide concentration of the air in the container is higher than the target concentration, the concentration controller (55) starts the operation of the gas supply device (30) to supply the nitrogen-enriched air (consisting of 90% nitrogen and 10% oxygen) to the interior of the container (11), or opens the exhaust valve (46*b*) of the exhaust portion (46) so that the air in the container is exhausted out of the container via the exhaust duct (46*a*). That is to say, an operation for reducing the carbon dioxide concentration of the air in the container (11) is performed by restarting the supply of the nitrogen-enriched air to the interior of the container (11) or by exhausting the air in the container (11) out of the container (11). In this case, the supply of the nitrogen-enriched air and the exhaustion of the air out of the container may be performed simultaneously. Moreover, simultaneously with the supply of the nitrogen-enriched air or the exhaustion of the air out of the container, the intake valve (47*b*) of the intake portion (47) may be opened to supply the outside air (consisting of 0.03% carbon dioxide) having a lower carbon dioxide concentration than the air in the container via the intake duct (47*a*) to the interior of the container (11).

Then, the concentration controller (55) determines whether the carbon dioxide concentration of the air in the container measured by the carbon dioxide sensor (52) has decreased to be equal to or less than the target carbon dioxide concentration. If the carbon dioxide concentration of the air in the container has decreased to be equal to or less than the target concentration, the concentration controller (55) stops the operation of the gas supply device (30) and/or the exhaustion operation.

Thereafter, the series of process steps described above is performed all over again. According to the operation described above, the carbon dioxide concentration of the air in the container (11) is controlled to the target concentration (5%).

In this embodiment, if the plants (15) are bananas, the target concentration of the carbon dioxide concentration is set to 5%. If the plants (15) are avocados, however, it is recommended that the target concentration be set to 10%.

<Supply Air Measurement Operation>

The concentration controller (55) performs a supply air measurement operation for measuring the oxygen concentration of the nitrogen-enriched air produced by the gas supply device (30) in accordance with a command entered by a user or periodically (e.g., every ten days). The supply air measurement operation is performed while the gas supply device (30) is working and the interior fans (26) are stopped, such as during the concentration control operation or a test run.

During the supply air measurement operation, the concentration controller (55) controls the operation of the gas supply device (30), the intake portion (47), and the exhaust portion (46) in the same manner as during the concentration control operation. On the other hand, during the supply air measurement operation, the concentration controller (55) instructs the measurement on-off valve (82) to open.

If the measurement on-off valve (82) is opened while the gas supply device (30) is working, part of the nitrogen-enriched air produced by the gas supply device (30) and passing through the supply passage (44) is diverged and flows into the branch pipe (81). The nitrogen-enriched air that has entered the branch pipe (81) flows into the oxygen sensor box (51*a*) in the oxygen concentration sensor (51), and the oxygen concentration of the nitrogen-enriched air is measured. In this manner, during the supply air measurement operation, part of the nitrogen-enriched air passing through the supply passage (44) is guided via the branch pipe (81) to the oxygen sensor (51). Thus, the oxygen concentration of the nitrogen-enriched air produced in the gas supply device (30) is measured by the oxygen sensor (51) provided to measure the oxygen concentration of the air in the container.

If the oxygen concentration of the nitrogen-enriched air produced in the gas supply device (30) is measured in this way, it may be determined whether the composition of the nitrogen-enriched air produced in the gas supply device (30) (oxygen concentration and nitrogen concentration) is a desired composition (consisting of 90% nitrogen and 10% oxygen, for example).

Note that the nitrogen-enriched air that has passed through the oxygen concentration sensor (51) also passes through the carbon dioxide sensor (52). Thus, during the supply air measurement operation, the carbon dioxide concentration of the nitrogen-enriched air may be measured by the carbon dioxide sensor (52) so as to calibrate the carbon dioxide sensor (52). That is, the nitrogen-enriched air is produced by replacing part of the oxygen in the outside air (consisting of 0.03% carbon dioxide) with nitrogen, and thus, has approximately the same carbon dioxide concentration as the outside air. Therefore, if the setting is corrected such that the carbon dioxide concentration of the nitrogen-enriched air measured by the carbon dioxide concentration sensor (52) is 0.03%, the carbon dioxide sensor (52) may be calibrated.

—Position of Inlet of Exhaust Duct—

In this embodiment, as shown in FIG. 6, the exhaust duct (46*a*) comprising the exhaust passage has the inlet (interior opening) which opens through the interior wall (16*b*) on the side of the interior fans (26), i.e., to face the fan housing (27*c*). More specifically, the inlet of the exhaust duct (46*a*) opens near an outer peripheral surface of (on the side of) the fan housing (27*c*) toward the fan housing (27*c*).

From the interior fans (26) having the fan housing (27*c*) comprised of a cylindrical member according to this embodiment, the air is blown to flow in the extending direction of the fan housing (27*c*) (in the direction of the rotation axis in this embodiment). Thus, in a region around the outer peripheral surface of the fan housing (27*c*), the flow of the air in the container blown from the interior fans (26) is blocked by the fan housing (27*c*). That is, the region around the outer peripheral surface of the fan housing (27*c*) is a blocked region where the flow of the air blown from the interior fans (26) is blocked. Consequently, in the region around the outer peripheral surface of the fan housing (27*c*), dynamic pressure becomes lower, and static pressure becomes higher.

In this embodiment, the inlet of the exhaust duct (46*a*) is in the region around the outer peripheral surface of the fan housing (27*c*). Thus, the air blown from the interior fans (26) may substantially be prevented from flowing into the exhaust duct (46*a*) without having circulated through the container. This may reduce the risk that the outside air taken into the first space (S21) on the suction side of the interior fans (26) via the intake duct (47a) would be exhausted out of the container via the exhaust duct (46a) without having been sufficiently mixed with the air in the container.

—Advantages of First Embodiment—

As can be seen in the foregoing, according to this container refrigeration apparatus (10), the exhaust duct (46a) has the inlet at a location where the flow of the air blown from the interior fans (26) is blocked by a plate member (fan housing (27c)) provided in the second space (S22) on the blowout side of the interior fans (26). Thus, the dynamic pressure becomes lower and the static pressure becomes higher around the inlet of the exhaust duct (46a). This may substantially prevent the air blown from the interior fans (26) from flowing into the exhaust duct (46a) without having circulated through the container. This configuration may reduce the risk that the outside air taken into the first space (S21) on the suction side of the interior fans (26) would be exhausted out of the container via the exhaust duct (46a) without having been sufficiently mixed with the air in the container. Consequently, the oxygen concentration and carbon dioxide concentration of the air in the container (11) may be controlled with high accuracy.

Further, according to this container refrigeration apparatus (10), the fan housing (27e) surrounding the propeller fan (27a) of the interior fans (26) also functions as a plate member (27c) which blocks the flow of the air blown from the interior fans (26). Thus, according to this container refrigeration apparatus (10), the outside air, which has been taken into the first space (S21) on the suction side of the interior fans (26) and has not yet been sufficiently mixed with the air in the container, may be prevented from being exhausted out of the container via the exhaust duct (46a), without providing any additional plate member, i.e., without increasing the part count.

Moreover, according to this container refrigeration apparatus (10), the exhaust duct (46a) is formed through the first access door (16A) provided on the side of the interior fans (26). As a result, the mere provision of the first access door (16A) allows the inlet of the exhaust duct (46a) to be easily placed at a location where the flow of the air blown from the interior fans (26) is blocked by the plate member (fan housing (27c)) provided in the second space (S22).

In addition, according to this container refrigeration apparatus (10), the first access door (16A) faces both of the first and second spaces (S21) and (S22), and the exhaust and intake ducts (46a) and (47a) are formed through this first access door (16A). Thus, the exhaust duct (46a) having an opening in the second space (S22) and the intake duct (47a) having an opening in the first space (S21) may easily be obtained by simply forming passages which penetrate the first access door (16A) and allow the interior and exterior of the container to communicate with each other.

Further, according to this container refrigeration apparatus (10), the gas supply device (30) supplies the nitrogen-enriched air to the first space (S21) on the suction side of the interior fans (26). According to this configuration, the nitrogen-enriched air supplied to the first space (S21) may possibly flow into the exhaust duct (46a) without having circulated through the container. However, according to this container refrigeration apparatus (10), the inlet of the exhaust duct (46a) is at a location where the flow of the air blown from the interior fans (26) is blocked by the plate member (fan housing (27c)) provided in the second space (S22) on the blowout side of the interior fans (26). Thus, even if the gas supply device (30) is configured to supply the nitrogen-enriched air to the first space (S21) on the suction side of the interior fans (26), the nitrogen-enriched air supplied to the first space (S21) may be prevented from being exhausted out of the container via the exhaust duct (46a) without having been sufficiently mixed with the air in the container. Consequently, the oxygen concentration and carbon dioxide concentration of the air in the container (11) may be controlled with accuracy.

Furthermore, according to this container refrigeration apparatus (10), the inlet of the exhaust duct (46a) is located on the side of the interior fans (26). That is, the inlet of the exhaust duct (46a) is placed relatively close to the interior fans (26). Thus, while the interior fans (26) are working, the pressure difference between the inlet and outlet of the exhaust duct (46a) becomes relatively large, thereby increasing the amount of air exhausted. As a result, the oxygen concentration and carbon dioxide concentration of the air in the container may quickly be controlled to desired concentrations, respectively.

Furthermore, according to this container refrigeration apparatus (10), the outlet end of the supply passage (44) through which the nitrogen-enriched air is supplied to the internal storage space (S2) is in the first space (S21) on the suction side of the interior fans (26). On the other hand, the gas supply device (30) is in the exterior storage space (S1). While the interior fans (26) are working, the pressure in the first space (S21) on the suction side of the interior fans (26) becomes lower than the pressure in the external space of the container (atmospheric pressure). Thus, with the outlet end of the supply passage (44) placed in the first space (S21) on the suction side of the interior fans (26), the nitrogen-enriched air transport capacity of the gas supply device (30) increases due to the pressure difference between the first and second spaces (S21) and (S22) while the interior fans (26) are working. As a result, the amount of the nitrogen-enriched air supplied by the gas supply device (30) increases while the interior fans (26) are working, which allows the oxygen concentration and carbon dioxide concentration in the air in the container to be controlled quickly to desired concentrations, respectively.

Second Embodiment of the Present Invention

A container refrigeration apparatus (10) according to the second embodiment is obtained by modifying the configuration of the supply passage (44) of the gas supply device (30) according to the first embodiment. Specifically, in the second embodiment, the supply passage (44) has an outlet end located in the second space (S22) in the internal storage space (S2) on the blowout side of the interior fans (26) as shown in FIG. 8. More specifically, the outlet end of the supply passage (44) is located below the inlet of the exhaust duct (46a) in the second space (S22) in which the air is blown downward from the interior fans (26). Other components are the same as those of the first embodiment.

According to the container refrigeration apparatus (10) of the second embodiment, the outlet end of the supply passage (44) is located below the inlet of the exhaust duct (46a) in the second space (S22) in which the air is blown downward from the interior fans (26). This substantially prevents the nitrogen-enriched air supplied to the internal storage space (S2) via the supply passage (44) from flowing into the exhaust duct (46a) without having circulated through the container. That is, the nitrogen-enriched air is reliably supplied into the container. As a result, the nitrogen-enriched air supplied to the internal storage space (S2) may be prevented from being exhausted out of the container via the exhaust duct (46a) without having been mixed sufficiently with the air in the container. Consequently, the oxygen concentration and carbon dioxide concentration of the air in the container (11) may be controlled with accuracy.

Other Embodiments

The embodiments described above may be modified in the following manner.

In the embodiments described above, the plate member (27c) forming the blocked region where the flow of the air blown from the interior fans (26) is blocked is comprised of the fan housing (27c). However, the plate member (27c) according to the present invention is not limited to the fan housing (27c). Another plate member may be provided in addition to the fan housing (27c). Further, if the interior fans (26) do not have the fan housing (27c), another plate member may be provided.

Moreover, in the embodiments described above, the interior fans (26) are comprised of axial fans each having a propeller fan (27a). However, the interior fans (26) are not limited to the axial fans. Moreover, the interior fans (26) may be configured without the fan housing (27c).

In the embodiments described above, the exhaust duct (46a) of the exhaust portion (46) and the intake duct (47a) of the intake portion (47) are formed inside the first access door (16A), so that the first access door (16A), the exhaust portion (46), and the intake portion (47) are configured as a single access door unit (40). However, the exhaust portion (46) and the intake portion (47) may be formed in a portion other than the first access door (16A).

In the embodiments described above, the blocking member (53) forming a region where the flow of the air blown from the interior fans (26) is blocked is comprised of the fixing member (53) covering the oxygen sensor (51) and the carbon dioxide sensor (52). However, the blocking member according to the present invention is not limited to the fixing member (53). For example, instead of providing the fixing member (53), the fan housing (27c) may comprise the blocking member. Specifically, the inlet (membrane filter (54)) of the air passage (58) may be located in the region around the outer peripheral surface of the fan housing (27c) where the flow of the air blown from the interior fans (26) is blocked such that the fan housing (27c) may be used as the blocking member.

The concentration controller (55) may perform the supply air measurement operation periodically, and store the oxygen concentration of the nitrogen-enriched air thus measured. In such a case, whether a malfunction has occurred in the gas supply device (30) may be determined from the variation in oxygen concentration of the nitrogen-enriched air with time.

In the embodiments described above, the air pump (31) has the pressurizer (31a) and the depressurizer (31b), and the depressurizer (31b) of the air pump (31) sucks nitrogen-enriched air. However, a suction pump sucking the nitrogen-enriched air may be provided separately, for example.

Also, in the embodiments described above, although two adsorption columns, namely, the first and second adsorption columns (34) and (35), are used to adsorb/desorb nitrogen in the embodiments described above, the number of the adsorption columns to use is not particularly limited. For example, six adsorption columns may be used as well.

Further, in the first embodiment, the nitrogen-enriched air is supplied into the container (11) to reduce the oxygen concentration of the air in the container (11) to the oxygen concentration of the nitrogen-enriched air (consisting of 10% oxygen). However, the supply of the nitrogen-enriched air may be stopped after the oxygen concentration has been reduced to the vicinity of the oxygen concentration of the nitrogen-enriched air (consisting of, for example, 12% oxygen).

INDUSTRIAL APPLICABILITY

As can be seen from the foregoing, the present invention is useful for a container refrigeration apparatus which cools the air in a container and controls the composition of the air in the container.

DESCRIPTION OF REFERENCE CHARACTERS

10 Container Refrigeration Apparatus
11 Container
12 Casing
15 Plants
16A First Access Door (Inspection Door)
20 Refrigerant Circuit
21 Compressor
22 Condenser
23 Expansion Valve (Expansion Mechanism)
24 Evaporator
26 Interior Fan
27a Propeller Fan (Rotary Vane)
27c Fan Housing (Plate Member)
30 Gas Supply Device
44 Supply Passage
46a Exhaust Duct (Exhaust Passage)
47a Intake Duct (Intake Passage)
60 CA System (Inside Air Control System)

The invention claimed is:

1. A container refrigeration apparatus installed in a container which houses respiring plants, the container refrigeration apparatus comprising:
a refrigerant circuit in which a compressor, a condenser, an expansion mechanism, and an evaporator are connected together to perform a refrigeration cycle;
a casing which is provided at an open end of the container, and forms an internal storage space housing the evaporator and communicating with the interior of the container; and
an interior fan which is provided in the internal storage space, and circulates air between the interior of the container and the internal storage space, wherein
the container refrigeration apparatus further comprises
an inside air control system which controls the composition of the air in the container, the inside air control system including: a gas supply device which supplies nitrogen-enriched air having a higher nitrogen concentration than outside air to the internal storage space;
an intake passage which allows a first space on the suction side of the interior fan in the internal storage space to communicate with the exterior of the container so that the outside air is guided into the first space; and
an exhaust passage which allows a second space on the blowout side of the interior fan in the internal storage space to communicate with the exterior of the container so that the air in the second space is guided to the exterior of the container, and
a plate member which forms, in the second space, a region where the flow of the air blown from the interior fan is blocked, and the exhaust passage has an inlet at a location where the flow of the air blown from the interior fan is blocked by the plate member.

2. The container refrigeration apparatus of claim 1, wherein the interior fan includes a rotary vane which is driven to rotate about a rotation axis, and a fan housing surrounding the rotary vane, and the plate member is comprised of the fan housing.

3. The container refrigeration apparatus of claim 2, wherein the interior fan is an axial fan.

4. The container refrigeration apparatus of claim 2, wherein an inspection door which is openable and closable is attached to the casing on the side of the interior fan, and the exhaust passage is formed through the inspection door.

5. The container refrigeration apparatus of claim 4, wherein the inspection door faces both of the first and second spaces, and the suction passage is formed through the inspection door.

6. The container refrigeration apparatus of claim 1, wherein the gas supply device includes a supply passage which supplies the nitrogen-enriched air to the second space.

7. The container refrigeration apparatus of claim 1, wherein the gas supply device includes a supply passage which supplies the nitrogen-enriched air to the first space.

8. The container refrigeration apparatus of claim 1, further comprising:

an oxygen sensor which measures an oxygen concentration of the air in the container;

a carbon dioxide sensor which measures a carbon dioxide concentration of the air in the container;

an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air; and a blocking member which forms, in the second space, a region where the flow of the air blown from the interior fan is blocked, wherein the air passage has an inlet at a location where the flow of the air blown from the interior fan is blocked by the blocking member.

9. The container refrigeration apparatus of claim 3, wherein an inspection door which is openable and closable is attached to the casing on the side of the interior fan, and the exhaust passage is formed through the inspection door.

10. The container refrigeration apparatus of claim 9, wherein the inspection door faces both of the first and second spaces and, and the suction passage is formed through the inspection door.

11. The container refrigeration apparatus of claim 2, further comprising:

an oxygen sensor which measures an oxygen concentration of the air in the container;

a carbon dioxide sensor which measures a carbon dioxide concentration of the air in the container;

an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;

a blocking member which forms, in the second space, a region where the flow of the air blown from the interior fan is blocked, wherein the air passage has an inlet at a location where the flow of the air blown from the interior fan is blocked by the blocking member.

12. The container refrigeration apparatus of claim 3, further comprising:

an oxygen sensor which measures an oxygen concentration of the air in the container;

a carbon dioxide sensor which measures a carbon dioxide concentration of the air in the container;

an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;

a blocking member which forms, in the second space, a region where the flow of the air blown from the interior fan is blocked, wherein the air passage has an inlet at a location where the flow of the air blown from the interior fan is blocked by the blocking member.

13. The container refrigeration apparatus of claim 4, further comprising:

an oxygen sensor which measures an oxygen concentration of the air in the container;

a carbon dioxide sensor which measures a carbon dioxide concentration of the air in the container;

an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;

a blocking member which forms, in the second space, a region where the flow of the air blown from the interior fan is blocked, wherein the air passage has an inlet at a location where the flow of the air blown from the interior fan is blocked by the blocking member.

14. The container refrigeration apparatus of claim 5, further comprising:

an oxygen sensor which measures an oxygen concentration of the air in the container;

a carbon dioxide sensor which measures a carbon dioxide concentration of the air in the container;

an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;

a blocking member which forms, in the second space, a region where the flow of the air blown from the interior fan is blocked, wherein the air passage has an inlet at a location where the flow of the air blown from the interior fan is blocked by the blocking member.

15. The container refrigeration apparatus of claim 6, further comprising:
- an oxygen sensor which measures an oxygen concentration of the air in the container;
- a carbon dioxide sensor which measures a carbon dioxide concentration of the air in the container;
- an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;
- a blocking member which forms, in the second space, a region where the flow of the air blown from the interior fan is blocked, wherein
- the air passage has an inlet at a location where the flow of the air blown from the interior fan is blocked by the blocking member.

16. The container refrigeration apparatus of claim 7, further comprising:
- an oxygen sensor which measures an oxygen concentration of the air in the container;
- a carbon dioxide sensor which measures a carbon dioxide concentration of the air in the container;
- an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;
- a blocking member which forms, in the second space, a region where the flow of the air blown from the interior fan is blocked, wherein
- the air passage has an inlet at a location where the flow of the air blown from the interior fan is blocked by the blocking member.

17. The container refrigeration apparatus of claim 9, further comprising:
- an oxygen sensor which measures an oxygen concentration of the air in the container;
- a carbon dioxide sensor which measures a carbon dioxide concentration of the air in the container;
- an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;
- a blocking member which forms, in the second space, a region where the flow of the air blown from the interior fan is blocked, wherein
- the air passage has an inlet at a location where the flow of the air blown from the interior fan is blocked by the blocking member.

18. The container refrigeration apparatus of claim 10, further comprising:
- an oxygen sensor which measures an oxygen concentration of the air in the container;
- a carbon dioxide sensor which measures a carbon dioxide concentration of the air in the container;
- an air passage which allows the first and second spaces to communicate with each other so that the air is guided from the second space to the first space while the interior fan is rotating, and which is connected to the oxygen sensor and the carbon dioxide sensor to measure the oxygen concentration and the carbon dioxide concentration of the air;
- a blocking member which forms, in the second space, a region where the flow of the air blown from the interior fan is blocked, wherein
- the air passage has an inlet at a location where the flow of the air blown from the interior fan is blocked by the blocking member.

* * * * *